US005971649A

United States Patent [19]

To

[11] Patent Number: 5,971,649
[45] Date of Patent: *Oct. 26, 1999

[54] RING BINDER MECHANISM

[75] Inventor: Chun Yuen To, Shatin, The Hong Kong Special Administrative Region of the People's Republic of China

[73] Assignee: World Wide Stationery Manufacturing Co. Ltd., Hong Kong, The Hong Kong Special Administrative Region of the People's Republic of China

[ * ] Notice: This patent is subject to a terminal disclaimer.

[21] Appl. No.: 09/013,286

[22] Filed: Jan. 26, 1998

[51] Int. Cl.[6] .............................. B42F 3/04; B42F 13/00; F16B 15/00

[52] U.S. Cl. ................................ 402/36; 402/31; 402/32; 402/38; 402/41; 402/75; 411/457; 411/461; 411/462; 411/463

[58] Field of Search ................................. 402/31, 32, 36, 402/38, 41, 75; 411/457, 461, 462, 463

[56] References Cited

U.S. PATENT DOCUMENTS

| | | | |
|---|---|---|---|
| 5,100,253 | 3/1992 | Cooper | 402/75 |
| 5,160,209 | 11/1992 | Schuessler | 402/75 |
| 5,755,513 | 5/1998 | To | 402/36 |
| 5,788,391 | 8/1998 | Cheung | 402/38 |
| 5,810,500 | 9/1998 | Whaley | 402/31 |
| 5,816,729 | 10/1998 | Whaley | 402/31 |
| 5,836,709 | 11/1998 | Cheung | 402/38 |
| 5,846,013 | 12/1998 | To | 402/36 |
| 5,868,513 | 2/1999 | Law | 402/31 |

*Primary Examiner*—Willmon Fridie, Jr.
*Assistant Examiner*—Alisa Thurston
*Attorney, Agent, or Firm*—Hall, Priddy & Myers

[57] ABSTRACT

A ring binder mechanism adapted to be secured to a cover is disclosed as including a substantially rigid upper curved housing supporting a pair of plates to which three pairs of half-ring members are mounted, and a pair of rivets for engagement with the cover. The plates are pivotably movable between a first configuration in which the pairs of half-rings are closed, and a second configuration in which the pairs of half-rings are open. Each rivet includes an anchor plate to abut the cover and at least one claw penetrable into said cover in order to secure the ring binder mechanism to the cover, and the anchor plate includes a number of ridges or troughs.

11 Claims, 8 Drawing Sheets

RING BINDER MECHANISM

This invention relates in a first aspect to a ring binder mechanism intended to be secured to an article, e.g. a cover. This invention also relates in a second aspect to a securing device for securing the ring binder mechanism to the article.

BACKGROUND OF THE INVENTION

Conventional ring binder mechanisms include a substantially rigid upper cover supporting a pair of plates. To each of these plates are fixedly attached a number of half-rings. The plates are pivotally movable relative to each other between a first configuration in which the angle between the upper surfaces of the plates are less than 180°, so that the half-rings of the respective are closed to retain loose-leaf paper, and a second configuration in which the angle between the upper surfaces of the plates are more than 180°, so that the half-rings of the respective are open to allow loose-leaf paper to be inserted into or taken out from the half-rings. Such a conventional ring binder mechanism is usually secured to the cover by a pair of rivets, each adjacent a longitudinal end of the ring binder mechanism. Each of such rivets generally includes a post having a head portion which is engaged with the upper cover of the ring binder mechanism, and a number of claws penetrable into the cover, and thereby to secure the ring binder mechanism to the cover.

Various methods and arrangements have been devised with a view to enhancing the engagement between the rivets and the cover. One such improvement involves the inclusion of an anchor plate in the rivet. The anchor plate includes an abutment surface which, when the rivet is secured to the cover, abuts the cover. By way of such an arrangement, the ring binder mechanism can withstand a larger sideward (i.e. the direction transverse to the longitudinal axis of the ring binder mechanism) pulling force.

In order to further enhance the engagement between the rivets (and thus the ring binder mechanism) and the cover, the dimensions of the rivets are so designed that, when the rivets are properly engaged with the upper cover, the lateral sides of the rivets extend beyond the lateral sides of the upper cover. While such an arrangement achieves the intended purpose of enhancing the engagement between the rivets and the cover, it is found in practice that, during assembly, too large a force may be accidentally imparted on to the lateral sides of the rivets, and to thereby deform or bend it.

It is therefore an object of the present invention to provide a ring binder mechanism, and a rivet, in which the aforesaid shortcoming is mitigated, or at least to provide a useful alternative to the trade and public.

SUMMARY OF THE INVENTION

According to a first aspect of the present invention, there is provided a ring binder mechanism adapted to be secured to an article, which mechanism comprising a substantially rigid housing supporting a pair of pivotable members to which a plurality of half-ring members are mounted, and securing means for engagement with the article, wherein the pivotable members are pivotably movable between a first configuration in which the half-rings are closed, and a second configuration in which the half-rings are open, wherein the securing means comprises a plate member to abut the article and at least one securing member penetrable into said article to thereby secure said ring binder mechanism to said article, and wherein the plate member comprises at least one ridge member or trough member.

According to a second aspect of the present invention, there is provided a securing device for securing a ring binder mechanism to an article, wherein the securing means comprises a plate member to abut the article and at least one securing member penetrable into said article to thereby secure said ring binder mechanism to said article, and wherein the plate member comprises at least one ridge member or trough member.

BRIEF DESCRIPTION OF THE DRAWINGS

Preferred embodiments of the present invention will now be described with reference to the accompanying drawings, wherein.

DETAILED DESCRIPTION OF THE PREFERRED EMBODIMENTS

Figure 1:
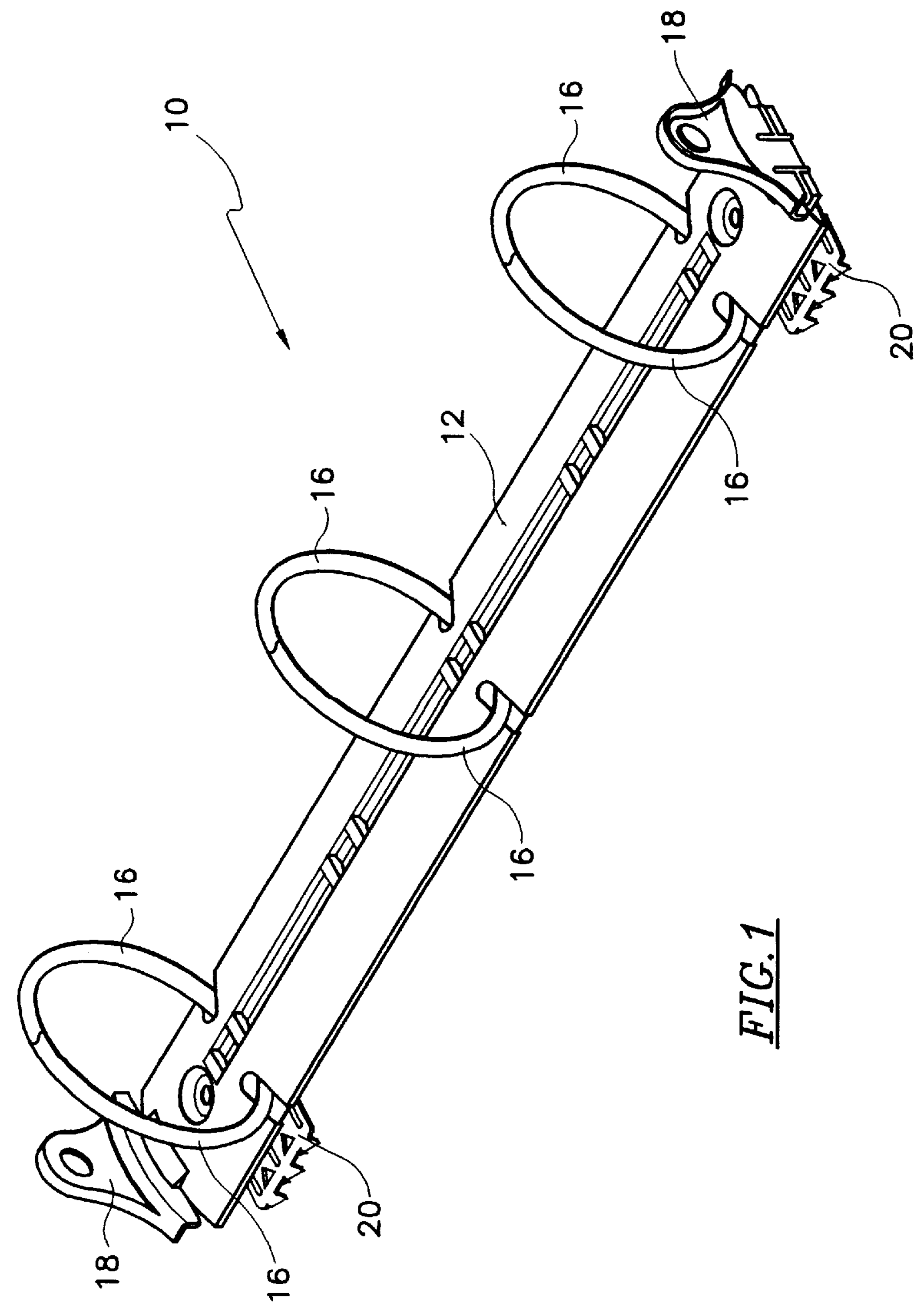
FIG. 1 is a top perspective of a first embodiment of a ring binder mechanism according to the first aspect of the present invention.
Figure 2:
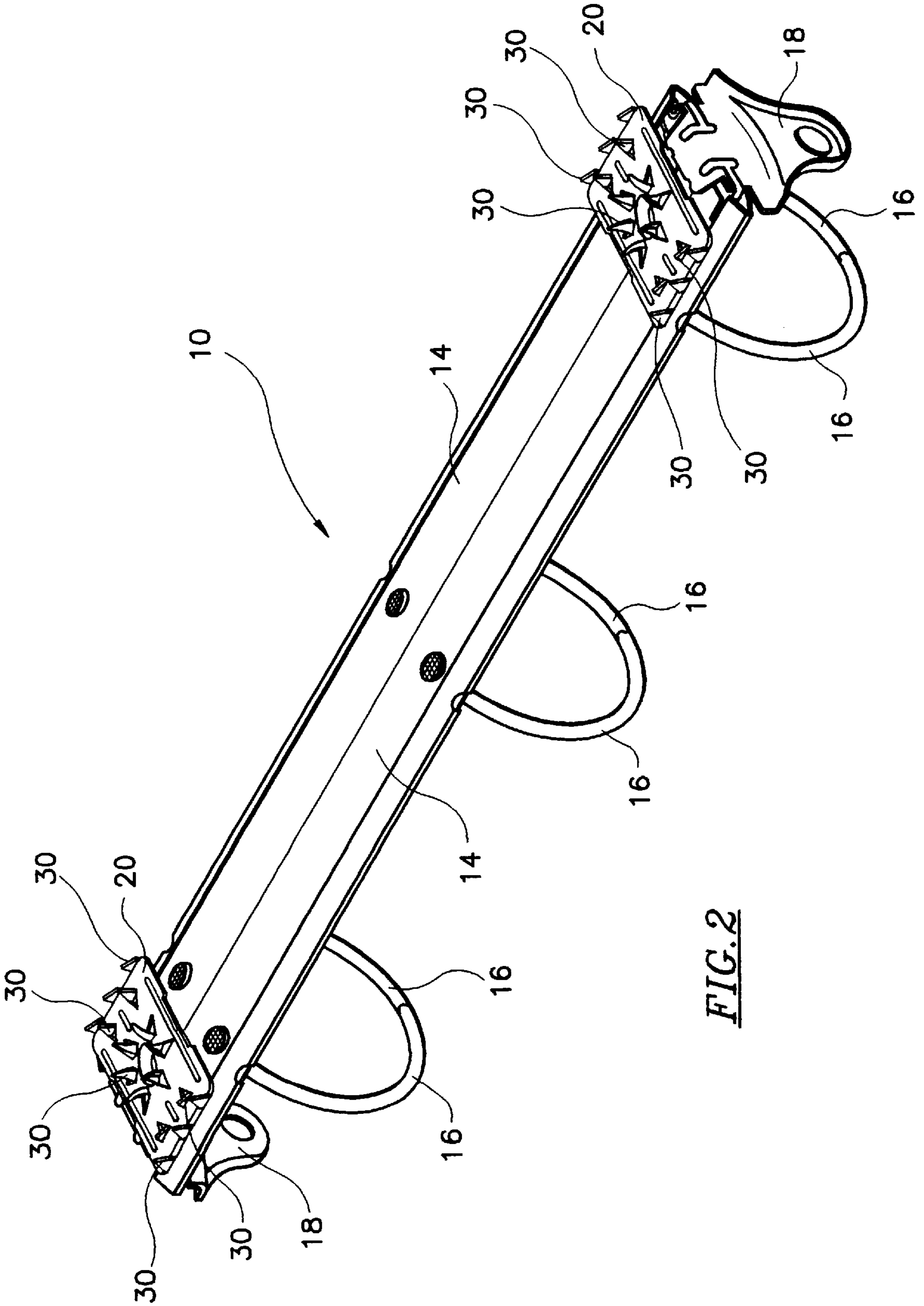
FIG. 2 is a bottom perspective of the ring binder mechanism shown in FIG. 1.
Figure 3:
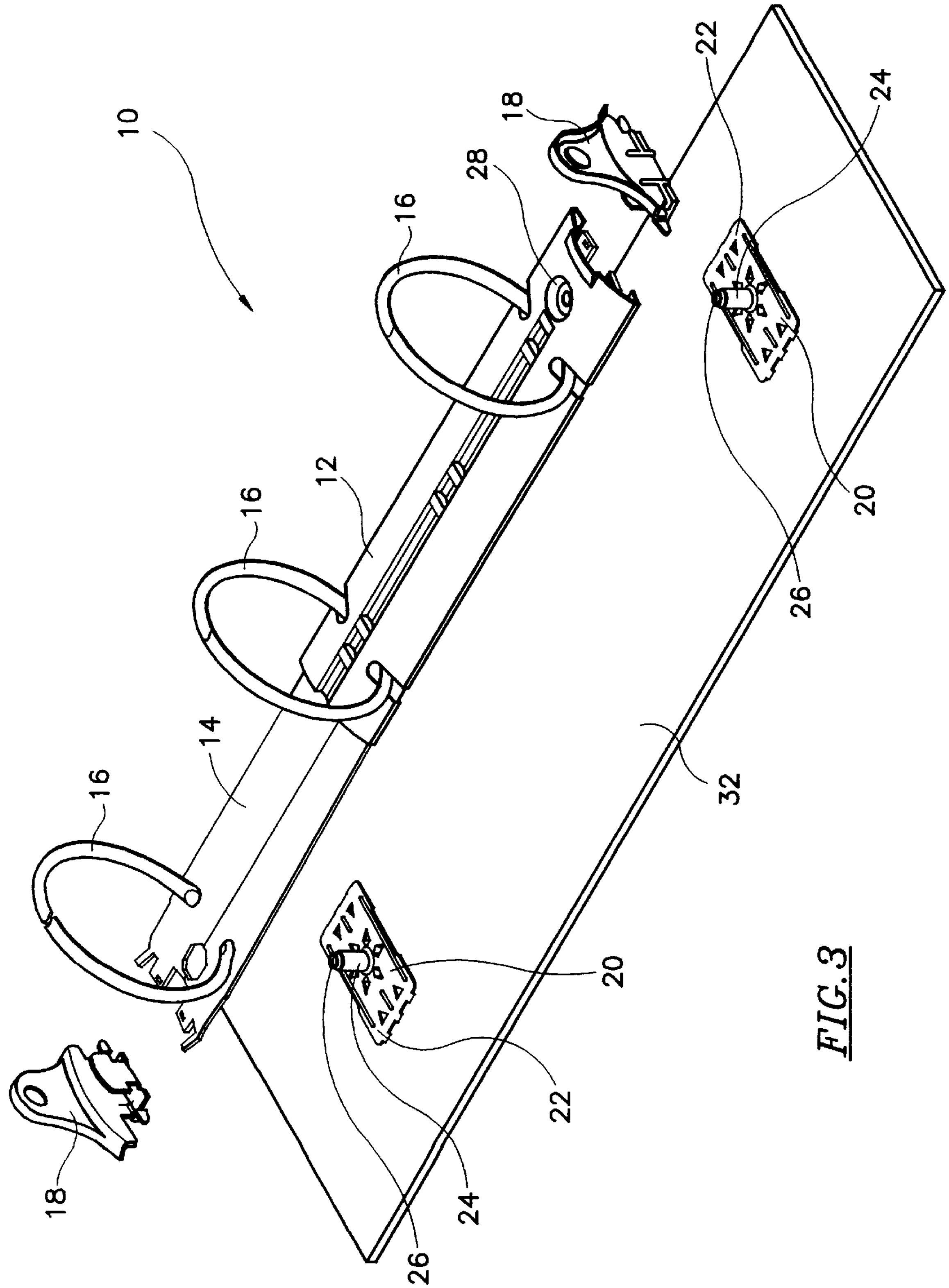
FIG. 3 is a partial exploded view of the ring binder mechanism shown in FIG. 1.

A first embodiment of a ring binder mechanism according to the present invention is shown in FIGS. 1 to 3 as generally designated as 10. The ring binder mechanism 10 includes an upper curved housing 12 supporting a pair of plates 14. To each of the plates 14 are fixedly attached three half-rings 16. At each longitudinal end of the ring binder mechanism 10 is provided an operating lever 18.

When the pair of plates 14 are in the configuration as shown in FIGS. 1 to 3, the angle between the upper surfaces (i.e. the surfaces which face towards the curved housing 12) of the plates 14 is less than 180°, and the respective half-rings 16 on the plates 14 are closed. The pair of operating levers 18 may be pivoted outward and away from each other and thereby to pivot the plates 14 in the conventional manner, until the pair of plates 14 are in a second stable configuration in which the angle between the upper surfaces of the plates 14 is more than 180°, and the respective half-rings 16 on the plates 14 are open. The plates 14 may be returned to the configuration as shown in FIGS. 1 to 3 by either pushing the pairs of half-rings 16 towards each other, or pivoting the pair of operating levers 18 towards each other.

The ring binder mechanism 10 also includes a pair of rivets 20, each adjacent one of its two longitudinal ends. The rivet 20 includes a substantially planar and rectangular anchor plate 22 with a central hollow post 24 extending perpendicular thereto. The post 24 has an upper end 26 which is deformable to engage with a recess 28 of the curved housing 12. Depending from the undersurface and two side edges of the anchor plate 22 are a number of claws 30. The claws 30 are penetrable into a cover 32, which may be made of cardboard or PVC (polyvinyl chloride). The anchor plate 22, the post 24 and the claws 30 are all integrally formed.

Figure 4B:
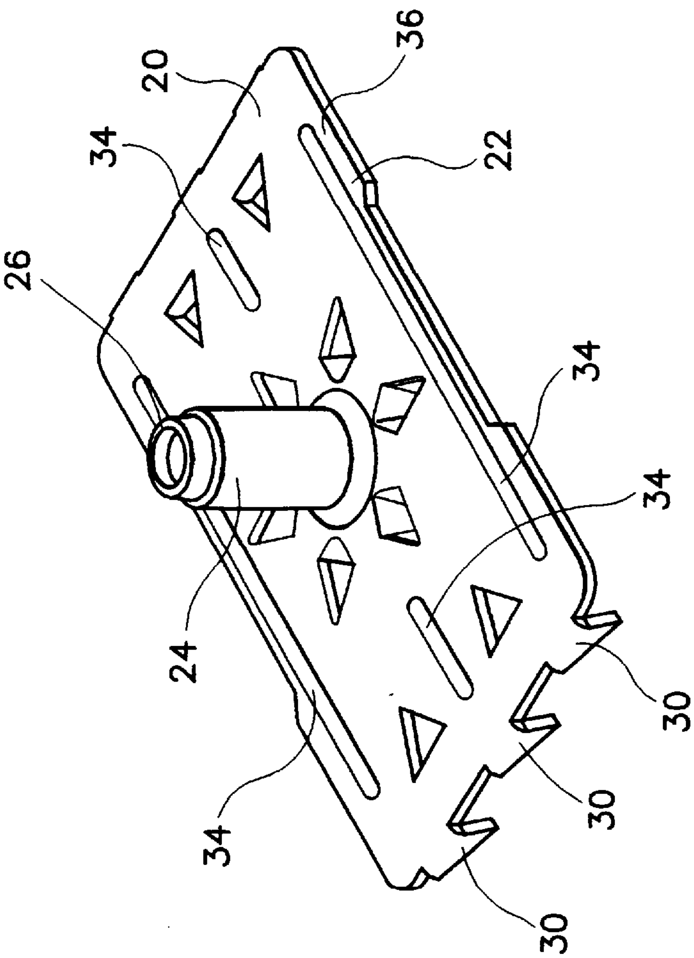
FIG. 4B is a top perspective view of the rivet shown in FIG. 4A.
Figure 4A:
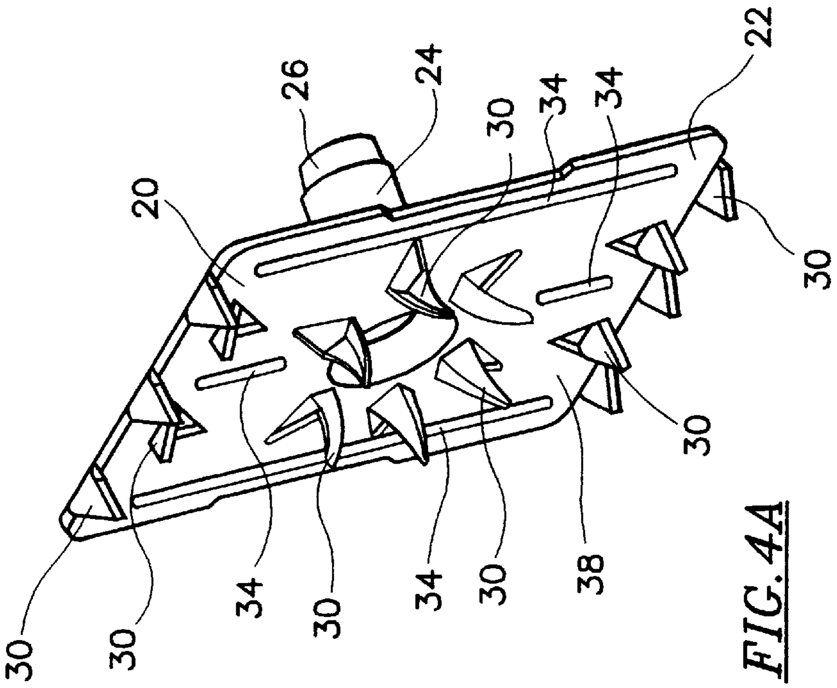
FIG. 4A is a bottom perspective view of a first embodiment of a rivet according to the second aspect of the present invention.

As shown more clearly in FIGS. 4A and 4B, the rivet 20 includes a number of parallel ridges/troughs 34. In the specific rivet 20 shown in FIGS. 4A and 4B, the ridges/troughs 34 form bulges (thus ridges) on an upper major surface 36 of the anchor plate 20, and form recesses (thus troughs) on a lower major surface 38 of the anchor plate 20. It is also possible to arrange the ridges/troughs 34 such that they form recesses on the upper major surface 36 of the anchor plate 20, and form bulges on the lower major surface 38. It is also possible to so arrange the ridges/troughs 34 that one or more of them form bulges on the upper major surface 36 of the anchor plate 20, and one or more of them form recesses on the lower major surface 38.

It can also be seen that the anchor plate 20 includes a pair of longer side edges and a pair of shorter side edges. Two outer ridges/troughs 34 run parallel to the pair of longer side edges, and the length of each of these two outer ridges/troughs 34 is over 50% of the length of each of the longer side edges. As can be seen in FIGS. 1 and 2, when the rivets 20 are properly engaged with the curved housing 12, the ridges/troughs 34 are transverse to the longitudinal axis of the curved housing 12.

Figure 5:
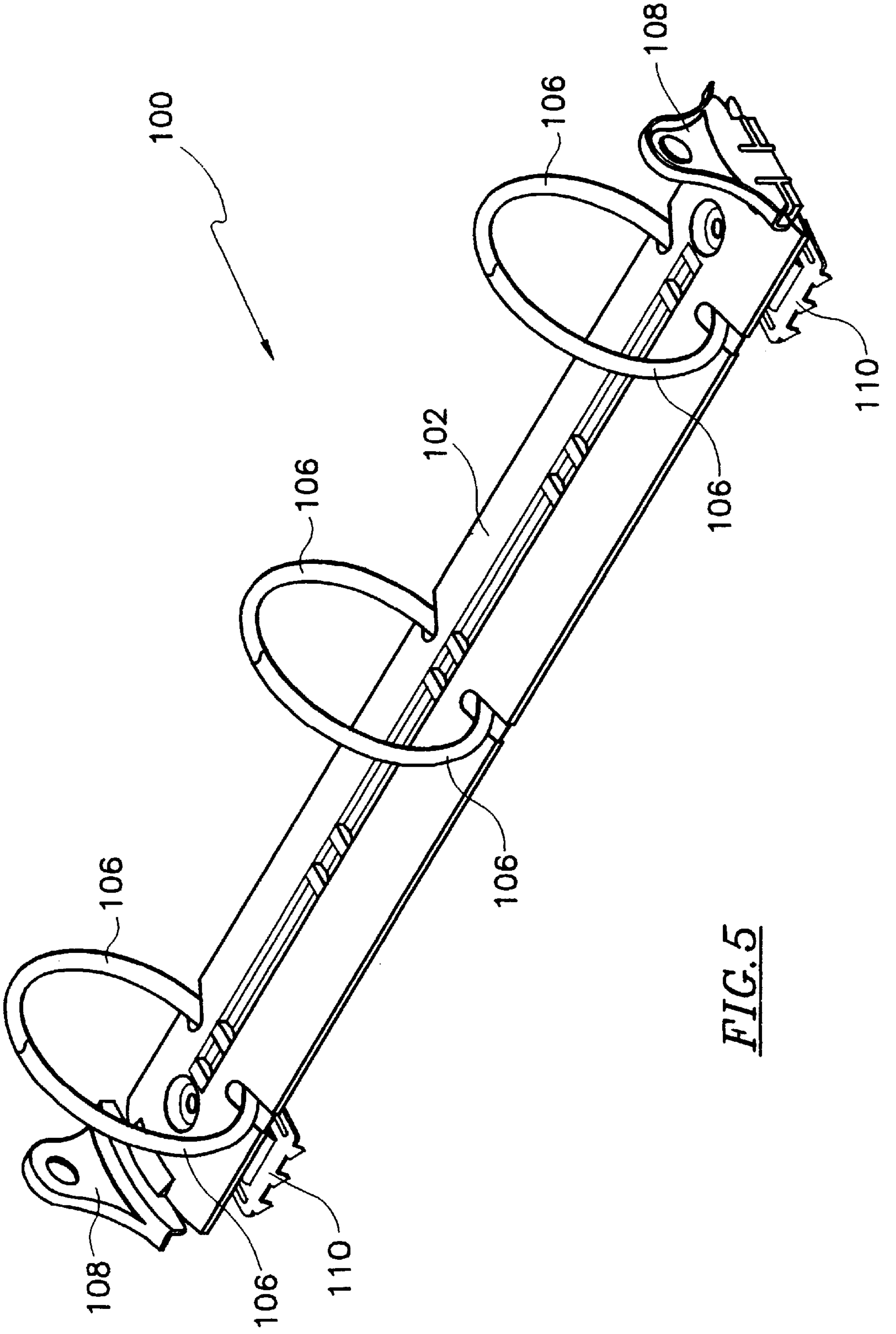
FIG. 5 is a top perspective of a second embodiment of a ring binder mechanism according to the first aspect of the present invention.
Figure 6:
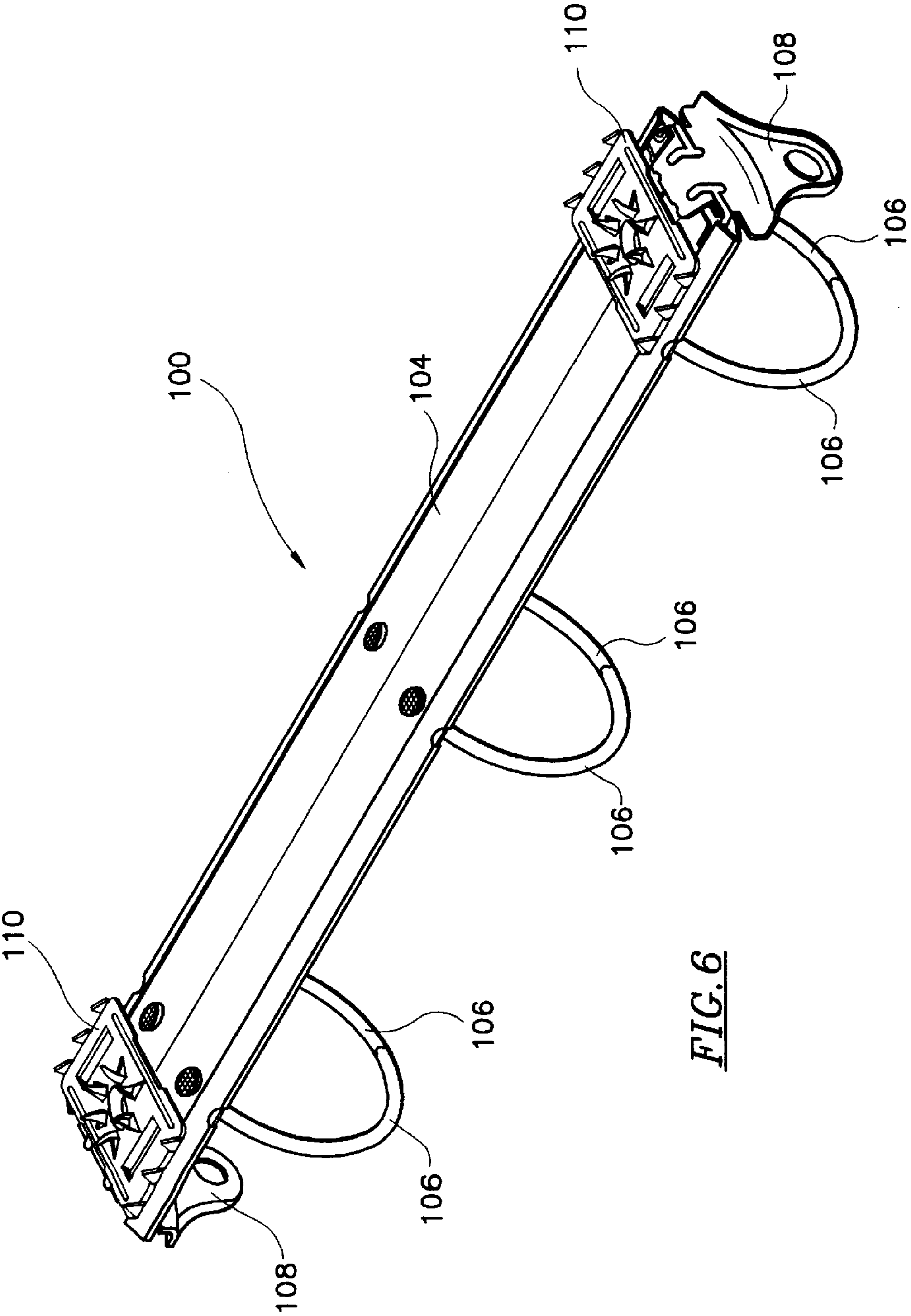
FIG. 6 is a bottom perspective of the ring binder mechanism shown in FIG. 5.
Figure 7:
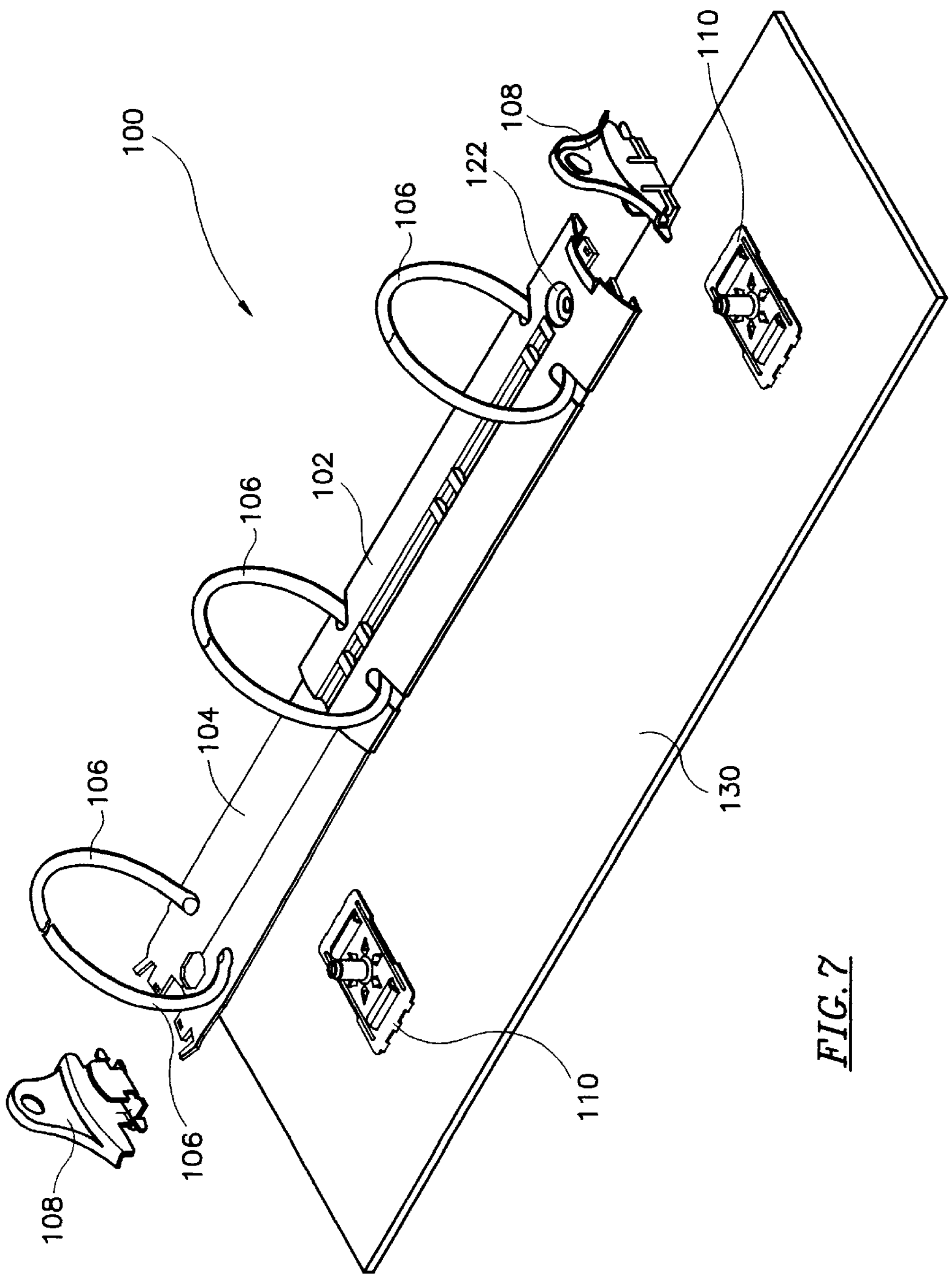
FIG. 7 is a partial exploded view of the ring binder mechanism shown in FIG. 5.

A second embodiment of a ring binder mechanism according to the present invention is shown in FIGS. 5 to 7 as generally designated as 100. As in the ring binder mechanism 10 shown in FIGS. 1 to 3, the ring binder mechanism 100 includes an upper curved housing 102 supporting a pair of plates 104, to which three pairs of half-rings 106 are fixedly attached. A pair of operating levers 108 are provided at the longitudinal ends of the ring binder mechanism 100 to control the opening and closing of the three pairs of half-rings 106. Adjacent to each longitudinal end of the ring binder mechanism 100 is provided a rivet 110.

Figure 8B:
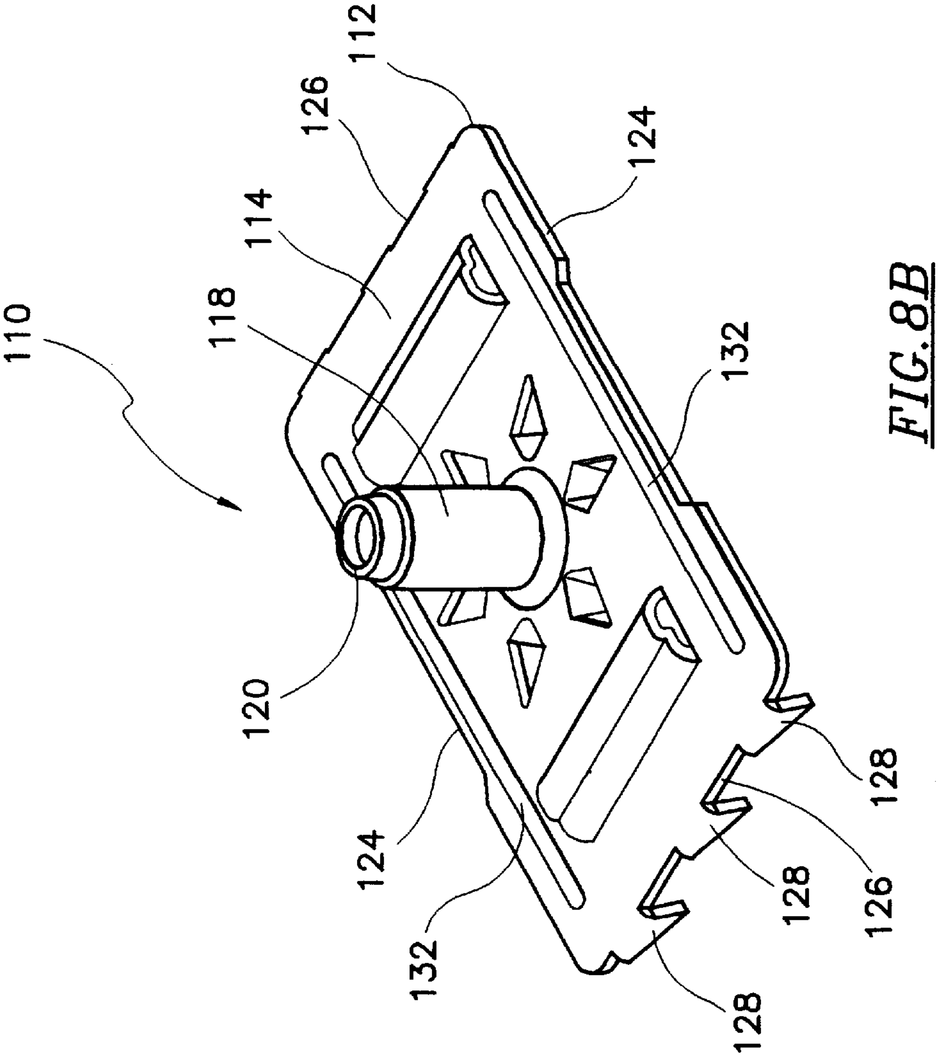
FIG. 8B is a top perspective view of the rivet shown in FIG. 8A.
Figure 8A:
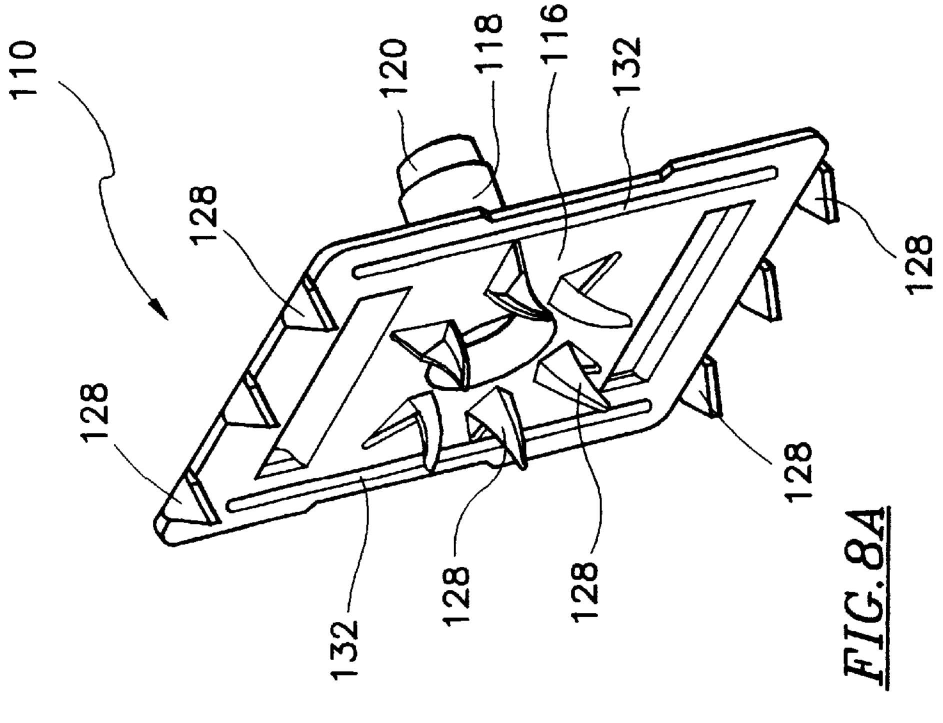
FIG. 8A is a bottom perspective view of a second embodiment of a rivet according to the second aspect of the present invention.

As can be seen more clearly in FIGS. 8A and 8B, each rivet 110 includes an anchor plate 112 having an upper major surface 114 and a lower major surface 116. Extending away from and perpendicular to the upper major surface 114 is a central hollow post 118, which has an open end 120 which is deformable to engage with a recess 122 of the upper curved housing 102. The anchor plate 112 includes a pair of longer side edges 124 and a pair of shorter side edges 126. Depending from the pair of shorter side edges 126 and the lower major surface 114 of the anchor plate 112 are a number of claws 128 which are penetrable into a cover 130 in order to secure the ring binder mechanism 100 to the cover 130.

On the upper major surface 114 and the lower major surface 116 of the anchor plate 112 are a pair of ridges/troughs 132. In the specific rivet 110 shown in FIGS. 8A and 8B, the pair of ridges/troughs 132 form bulges (thus ridges) on the upper major surface 114 of the anchor plate 112, and form recesses (thus troughs) on the lower major surface 116 of the anchor plate 112. It is also possible to arrange the ridges/troughs 132 such that they form recesses on the upper major surface 114 of the anchor plate 112, and form bulges on the lower major surface 116. It is also possible to so arrange the ridges/troughs 132 that one of them forms a bulge on the upper major surface 114 of the anchor plate 112, and one of them forms a recess on the lower major surface 116.

Both these ridges/troughs 132 run parallel to the each other, and to the pair of longer side edges 124. Each of these two ridges/troughs 132 is of a length which is over 50% of the length of each of the longer side edges 124. As can be seen in FIG. 7, when the rivets 110 are properly engaged with the upper curved housing 102, the pair of ridges/troughs 132 are transverse to the longitudinal axis of the housing 102.

It should be understood that the above only illustrates embodiments in which the present invention may be carried out, and that further modifications and/or alterations may be made thereto without departing from the spirit of the invention.

What is claimed is:

1. A ring binder mechanism adapted to be secured to an article, which mechanism comprising a substantially rigid housing supporting a pair of pivotable members to which a plurality of half-ring members are mounted, and securing means for engagement with the article, wherein the pivotable members are pivotably movable between a first configuration in which the half-rings are closed, and a second configuration in which the half-rings are open, wherein the securing means comprises a plate member to abut the article and at least one securing member penetrable into said article to thereby secure said ring binder mechanism to said article, and wherein the plate member comprises at least one ridge member or trough member.

2. A ring binder mechanism according to claim 1 wherein said plate member comprises a plurality of ridge members or trough members.

3. A ring binder mechanism according to claim 2 wherein said plurality of ridge members or trough members are substantially parallel to each other.

4. A ring binder mechanism according to claim 1 wherein said at least one ridge member or trough member extends transverse to the longitudinal axis of said housing.

5. A ring binder mechanism according to claim 1 wherein said plate member comprises at least one ridge member and at least one trough member.

6. A ring binder mechanism according to claim 1 wherein said plate member is substantially rectangular in shape and having a first pair of edges and a second pair of edges, wherein said first pair of edges are longer than said second pair of edges, and wherein said at least one ridge member or trough member is substantially parallel to said first pair of edges.

7. A securing device for securing a ring binder mechanism to an article, wherein the securing means comprises a plate member to abut the article and at least one securing member penetrable into said article to thereby secure said ring binder mechanism to said article, and wherein the plate member comprises at least one ridge member or trough member.

8. A securing device according to claim 7 wherein said plate member comprises a plurality of ridge members or trough members.

9. A securing device according to claim 8 wherein said plurality of ridge members or trough members are substantially parallel to each other.

10. A securing device according to claim 7 wherein said plate member comprises at least one ridge member and at least one trough member.

11. A securing device according to claim 7 wherein said plate member is substantially rectangular in shape and having a first pair of edges and a second pair of edges, wherein said first pair of edges are longer than said second pair of edges, and wherein said at least one ridge member or trough member is substantially parallel to said first pair of edges.

* * * * *